US005575347A

United States Patent [19]
Uchibaba et al.

[11] Patent Number: 5,575,347
[45] Date of Patent: Nov. 19, 1996

[54] SUSPENSION DEVICE FOR CRAWLER VEHICLE

[75] Inventors: Kouichi Uchibaba; Naoki Matsumoto; Hajime Yoshimura, all of Saitama, Japan

[73] Assignee: Honda Giken Kogyo Kabushiki Kaisha, Tokyo, Japan

[21] Appl. No.: 400,021

[22] Filed: Feb. 28, 1995

[30] Foreign Application Priority Data

Feb. 28, 1994 [JP] Japan .................................. 6-030244

[51] Int. Cl.$^6$ ............................................. B62D 55/00
[52] U.S. Cl. ................................. 180/9.1; 180/9.34
[58] Field of Search ........................... 180/9.1, 9.21, 180/9.26, 9.34, 9.38, 9.5; 280/677, 680; 305/29, 30, 31, 32

[56] References Cited

U.S. PATENT DOCUMENTS

| | | | |
|---|---|---|---|
| 2,627,442 | 2/1953 | Junker | 305/32 |
| 3,713,661 | 1/1973 | Luthman et al. | 280/677 |
| 3,716,250 | 2/1973 | Gorres | 280/677 |
| 5,358,064 | 10/1994 | Oertley | 180/9.1 X |

FOREIGN PATENT DOCUMENTS 59-164270  9/1984  Japan ..................................... 180/9.1

Primary Examiner—Anne Marie Boehler
Assistant Examiner—Victor E. Johnson
Attorney, Agent, or Firm—Rosen, Dainow & Jacobs Limited Liability Partnership

[57] ABSTRACT

A suspension device in a crawler vehicle has a vehicle body, a pair of parallel spaced swing beams mounted on a rear portion of the vehicle body by a suspension for angular movement about a first axis located substantially longitudinally centrally thereof, a rear idle wheel rotatably supported on a front portion of each of the swing beams for rotation about a second axis, a rear drive wheel rotatably supported on a rear portion of each of the swing beams for rotation about a third axis, a crawler belt trained around the rear idle wheel and the rear drive wheel, and a front wheel rotatably mounted on a front portion of the vehicle body. The distance from the second axis to the first axis is greater than the distance from the first axis to the third axis. The second axis is positioned on a front end of each of the swing beams, and the third axis is positioned between the first axis and a rear end of each of the swing beams. Preferably, the distance from the second axis to the first axis and the distance from the first axis to the third axis have a ratio of about 2:1.

7 Claims, 6 Drawing Sheets

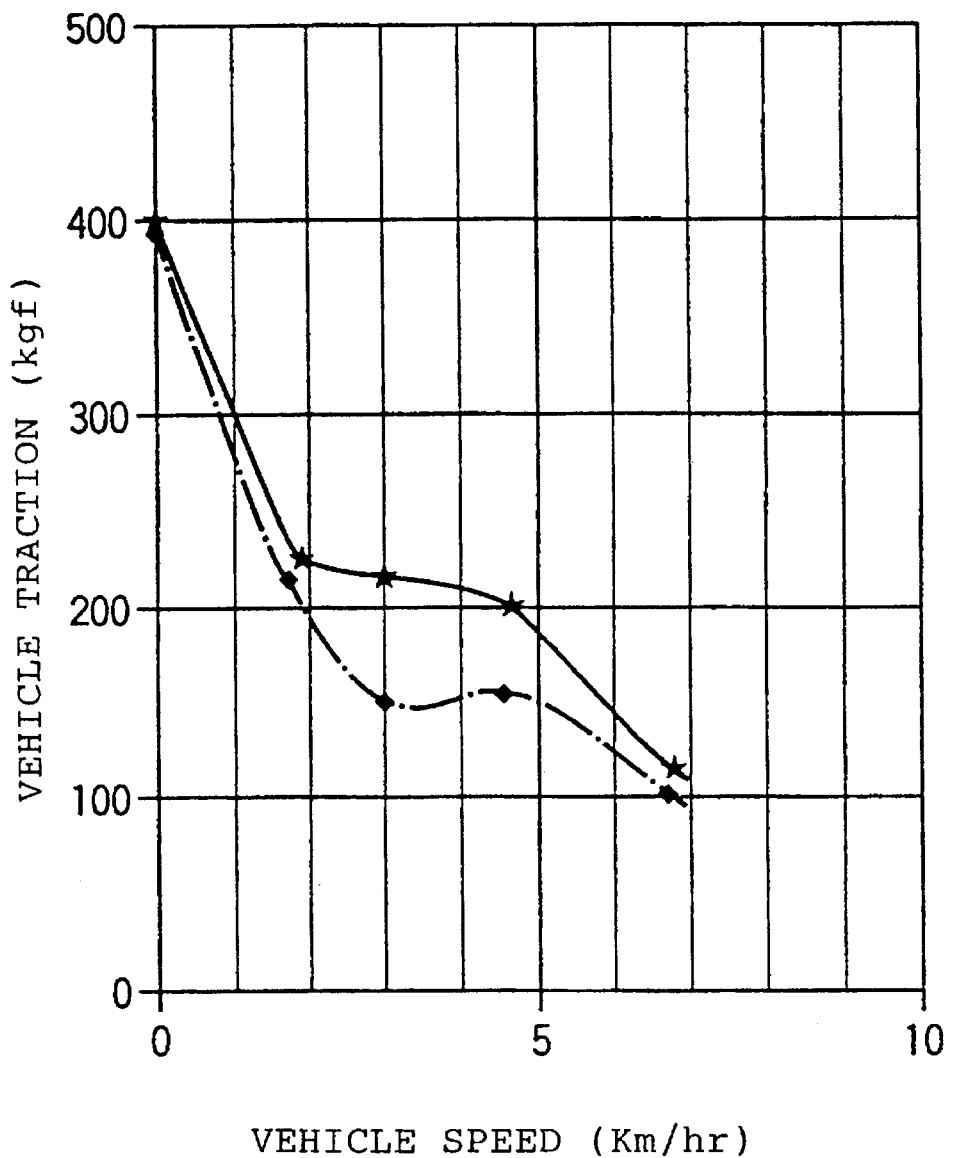

SUSPENSION DEVICE FOR CRAWLER VEHICLE

BACKGROUND OF THE INVENTION

1. Field of the Invention

The present invention relates to a suspension device for use in a crawler vehicle which has front steerable wheels with tires and rear drive wheels with crawler belts trained therearound.

2. Description of the Prior Art

Japanese laid-open utility model publication No. 3-129580 discloses a suspension device for use in a crawler vehicle having crawler belts trained around rear drive wheels.

Specifically, the disclosed suspension device has a pair of swing beams each swingable about a longitudinally central portion thereof and attached to a rear vehicle body portion through a suspension. An idle wheel with a tire and a drive wheel with a tire are rotatably mounted on respective front and rear end portions of each of the swing beams. A crawler belt is trained around the idle wheel and the drive wheel. Front wheels with tires are rotatably mounted on a front vehicle body portion. The crawler vehicle with the disclosed suspension device is capable of running over both paved roads and rough terrain.

Generally, for a vehicle with four wheels, i.e., two front wheels and two rear wheels, to be capable of running straight stably at a high speed, the distance between the front wheels and the rear wheels should preferably be as large as possible. This requirement applies also to crawler vehicles of the type described above. On the crawler vehicles, the distance between the axis about which the front wheels are rotatable and the axis about which the swing beams are swingable should be as large as possible.

Crawler vehicles should also be highly maneuverable and propellable on soft terrain such as muddy or snowy roads. Such a requirement can be met when the crawler belt portions under the idle wheels ride over the soft terrain and the crawler belt portions under the drive wheels compact the soft terrain for greater propulsive forces.

SUMMARY OF THE INVENTION

It is therefore an object of the present invention to provide a suspension device for use in a crawler vehicle for allowing the crawler vehicle to run straight highly stably at a high speed.

Another object of the present invention to provide a suspension device for use in a crawler vehicle for allowing the crawler vehicle to run with increased propulsive forces on soft terrain.

According to the present invention, there is provided a suspension device in a crawler vehicle, comprising a vehicle body having a front portion and a rear portion, a pair of parallel spaced swing beams mounted on the rear portion of the vehicle body by a suspension for angular movement about a first axis located substantially longitudinally centrally thereof, each of the swing beams having a front portion and a rear portion, a rear idle wheel rotatably supported on the front portion of each of the swing beams for rotation about a second axis, a rear drive wheel rotatably supported on the rear portion of each of the swing beams for rotation about a third axis, a crawler belt trained around the rear idle wheel and the rear drive wheel, and a front wheel rotatably mounted on the front portion of the vehicle body, the second axis being spaced from the first axis by a first distance greater than a second distance by which the third axis is spaced from the first axis.

Each of the swing arms has a front end and a rear end. The second axis may be positioned on the front end, and the third axis may be positioned between the first axis and the rear end.

The first distance and the second distance may have a ratio of about 2:1.

According to the present invention, there is also provided a suspension device in a crawler vehicle, comprising a vehicle body having a front portion and a rear portion, a pair of parallel spaced swing beams mounted on the rear portion of the vehicle body for angular movement about an axis located substantially longitudinally centrally thereof, each of the swing beams having a front end and a rear end, a rear idle wheel rotatably supported on the front end of each of the swing beams, a rear drive wheel rotatably supported on each of the swing beams between the axis and the rear end of each of the swing beams, a crawler belt trained around the rear idle wheel and the rear drive wheel, and a front wheel rotatably mounted on the front portion of the vehicle body.

The rear drive wheel may be rotatably supported on each of the swing beams substantially intermediate between the axis and the rear end of each of the swing beams.

Since the distance from the first axis to the second axis is greater than the distance from the first axis to the third axis, the crawler vehicle is allowed to run straight highly stably at a high speed.

A load applied to the first axis is divided into a higher load component imposed on the third axis, i.e., the axis of rotation of the rear drive wheel, and a lower load component imposed on the second axis, i.e., the axis of rotation of the rear idle wheel.

Accordingly, when the crawler vehicle runs on soft terrain such as muddy or snowy roads, the crawler belt portions positioned under the rear idle wheels, to which the lower load component is applied, ride over the soft terrain, and the crawler belt portions positioned under the rear drive wheels, to which the higher load component is applied, compact the soft terrain, so that the crawler belts can produce increased propulsive forces.

The above and further objects, details and advantages of the present invention will become apparent from the following detailed description of a preferred embodiment thereof, when read in conjunction with the accompanying drawings.

BRIEF DESCRIPTION OF THE DRAWINGS

FIG. 6 is a diagram showing running characteristics of a crawler vehicle according to an inventive example and a crawler vehicle according to a comparative example.

DETAILED DESCRIPTION OF THE PREFERRED EMBODIMENT

Figure 1:
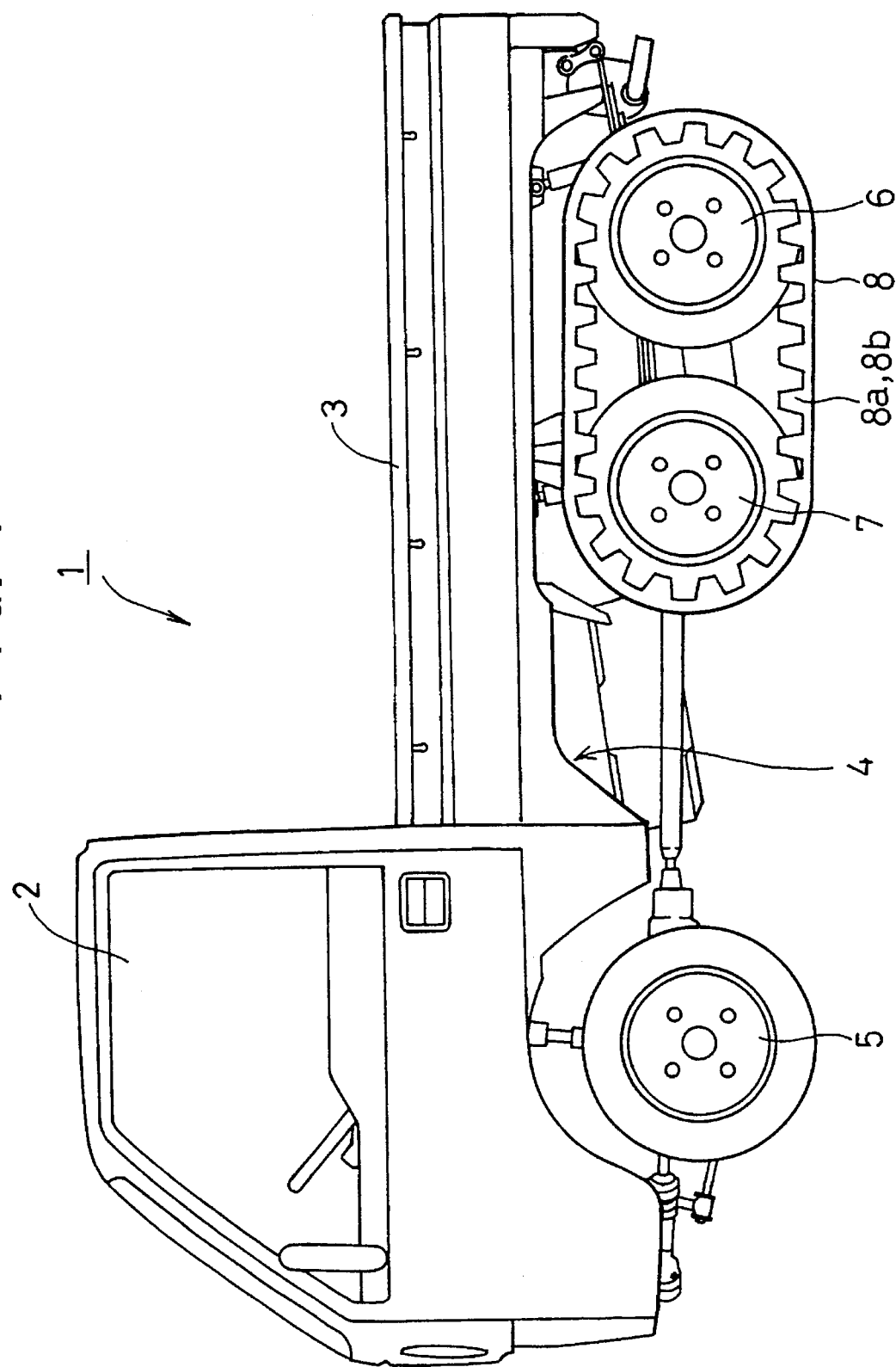
FIG. 1 is a side elevational view of a crawler vehicle which incorporates a suspension device according to the present invention.

As shown in FIG. 1, a crawler vehicle 1 which incorporates a suspension device according to the present invention is in the form of a light truck and has a vehicle body 4 including a cabin 2 and a cargo bed 3. The crawler vehicle 1 has a pair of front steerable drive wheels 5, a pair of rear drive wheels 6, and a pair of rear idle wheels 7 positioned between the front steerable drive wheels 5 and the rear drive wheels 6. Each of the wheels 5, 6, 7 is rotatably supported by the vehicle body 4 and has a pneumatic tire of rubber.

Endless crawler belts 8 are trained around respective sets of the rear drive and idle wheels 6, 7 that are positioned on respective sides of the vehicle body 4. The crawler belts 8 are made of a flexible and elastic material such as rubber. Each of the crawler belts 8 has a plurality of successive side guide teeth 8a on one side thereof and a plurality of successive side guide teeth 8b on the other side thereof.

Figure 2:
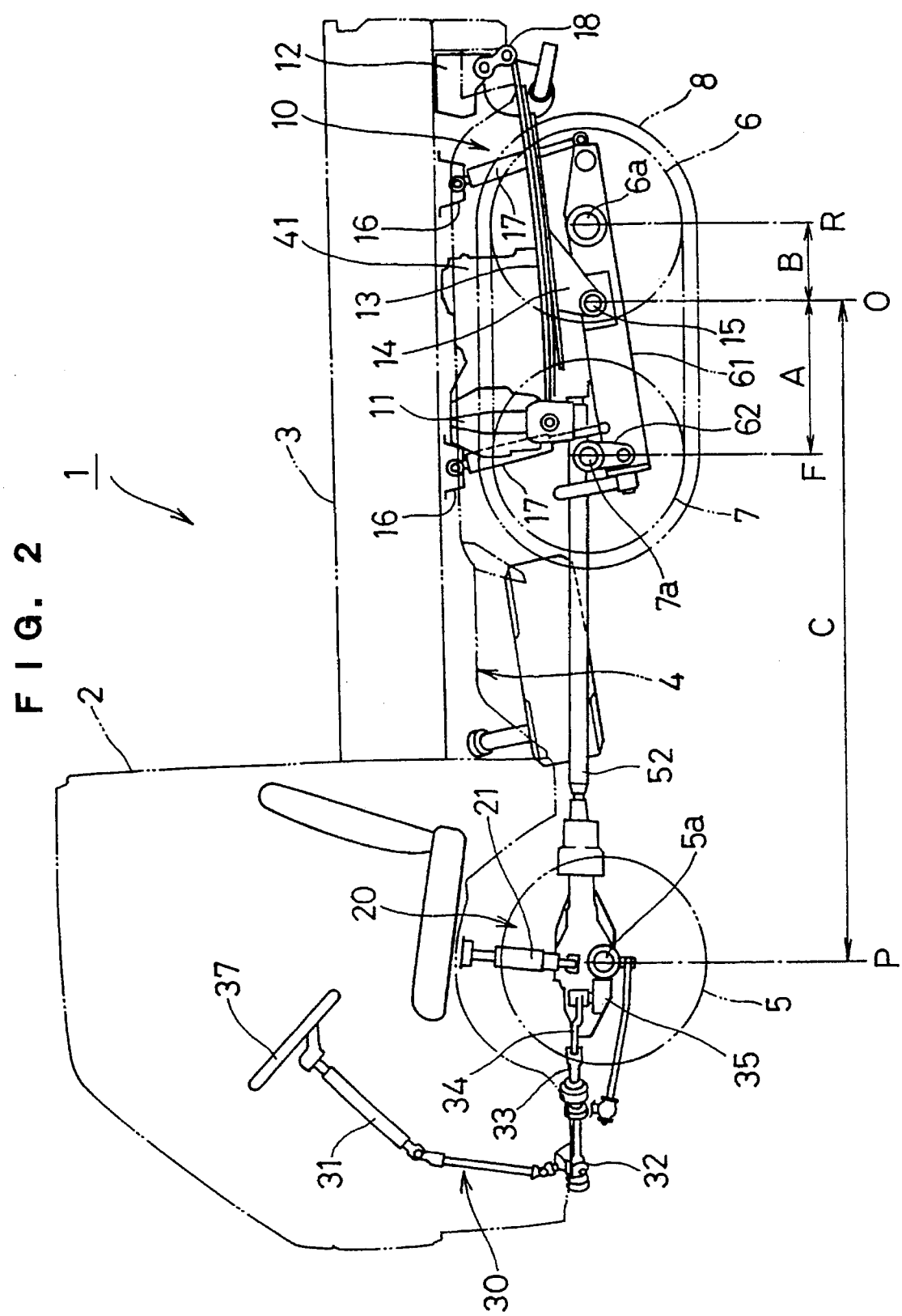
FIG. 2 is a schematic side elevational view of a power train and suspensions of the crawler vehicle.

As shown in FIG. 2, the vehicle body 4 supports a rear suspension 10, a front suspension 20, and a steering device 30.

The rear suspension 10 includes two identical assemblies for supporting the respective sets of the rear drive and idle wheels 6, 7. Each of the assemblies primarily comprises a leaf spring and a pair of hydraulic dampers 17 which jointly support a swing beam 61 on a rear portion of the vehicle body 4, i.e., the cargo bed 3, the swing beam 61 being swingable about its longitudinally central portion.

The rear suspension 10 will be described in greater detail below with respect to one of its two identical assemblies. A spring bracket 11 and a shackle bracket 12 are attached to a lower surface of the cargo bed 3. The leaf spring 13 has a front end coupled to the spring bracket 11 and a rear end coupled to the shackle bracket 12 through a shackle 18. The leaf spring 13 supports on its lower surface a pivot bracket 14 fixed thereto. The swing beam 61 is swingably connected to the pivot bracket 14 by a pivot shaft 15 for swinging movement about an axis O which is aligned with the pivot shaft 15 at the longitudinally central portion of the swing beam 61.

The swing beam 61 has front and rear ends connected to lower ends of the hydraulic dampers 17, respectively, which has upper ends connected to respective damper brackets 16 supported on the lower surface of the cargo bed 3.

The rear idle wheel 7 has an axle 7a mounted on the front end of the swing beam 61 through a hub carrier 62. The rear drive wheels 6 has an axle 6a mounted on the swing beam 61 between its rear end and the pivot shaft 15, preferably substantially intermediate therebetween. Therefore, the rear idle wheel 7 and the rear drive wheel 6 are rotatably mounted on the swing beam 61. The rear idle wheel 7 is rotatable about an axis F that is aligned with the axle 7a, and the rear drive wheel 6 is rotatable about an axis R that is aligned with the axle 6a.

The distance A from the axis O to the axis F is longer than the distance B from the axis O to the axis R. Preferably, the distances A, B have a ratio of about 2:1 (A:B=2:1).

Consequently, the axis O is positioned more rearwardly away from the front wheel 5 than would be if the distances A, B had a ratio of 1:1 (A:B=1:1).

The front suspension 20 also includes two identical assemblies for supporting the respective front wheels 5. Each of the assemblies primarily comprises a hydraulic damper 21 by which the front wheel 5 is rotatably supported below a front portion of the vehicle body 4, i.e., the cabin 2.

The steering device 30 is located in a front lower region of the cabin 2. The steering device 30 comprises a steering shaft 31 with a steering wheel 37 mounted on an upper end thereof, a gearbox 32 coupled to a lower end of the steering shaft 31, a pair of steering arms 33 (see also FIG. 3) connected to the gearbox 32, a pair of tie rods 34 connected to the respective steering arms 33, and a pair of knuckles 35 connected to the respective tie rods 34 and supporting the respective front wheels 5. Steering forces transmitted from the steering wheel 37 are transmitted through the steering shaft 31, the gearbox 32, the steering arms 33, the tie rods 34, and the knuckles 35 to the front wheels 5.

Figure 3:
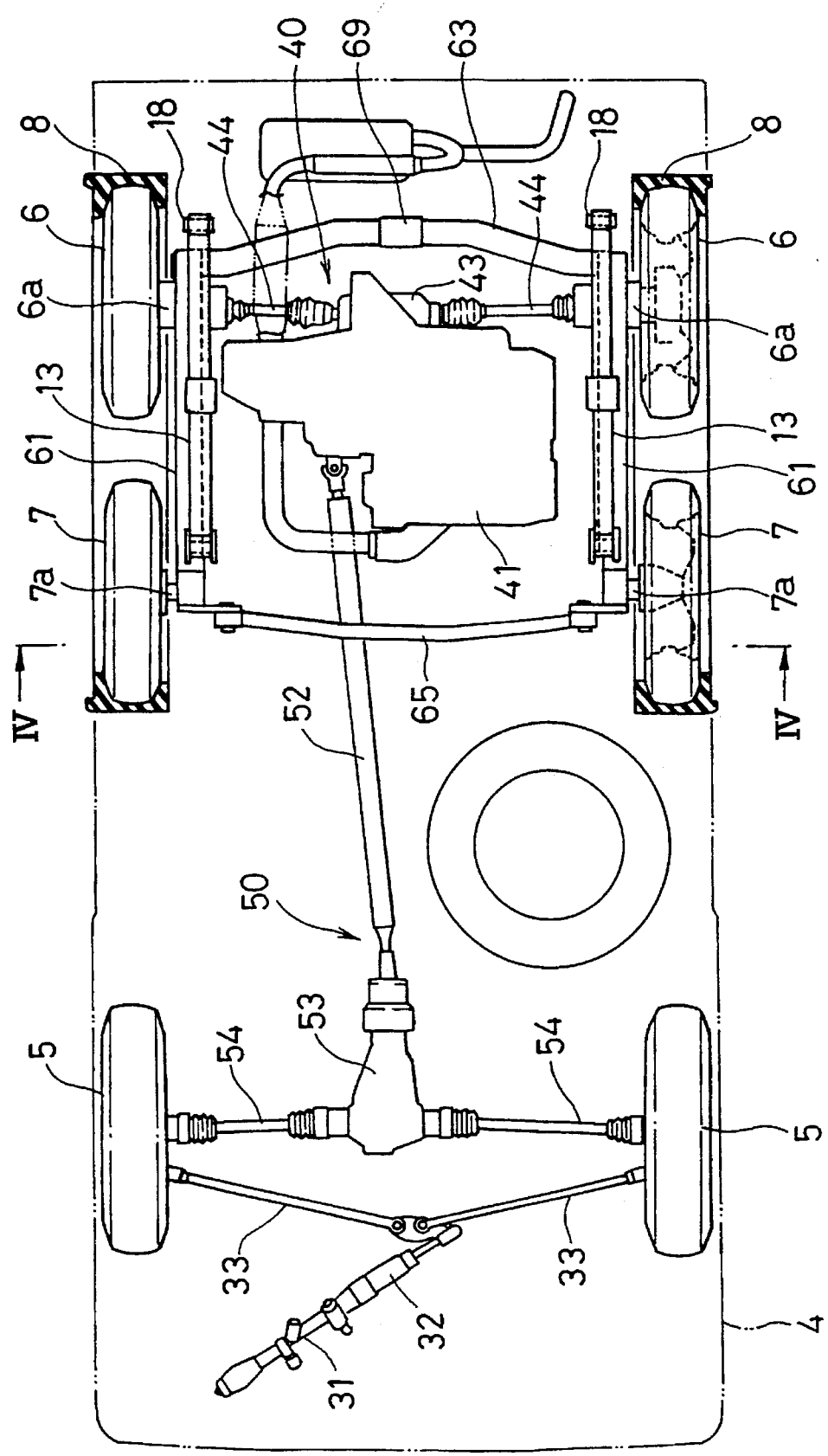
FIG. 3 is a plan view of the power train and suspensions of the crawler vehicle.

As shown in FIG. 3, a rear wheel drive device 40 and an engine 41 are positioned below the cargo bed 3. The rear wheel drive device 40 comprises a differential 43 and a pair of rear wheel drive shafts 44 which are located behind the engine 41. The differential 43 is operatively coupled to a transmission (not shown) combined with the engine 41, and the rear wheel drive shafts 44 have inner ends connected to the differential 43 and outer ends connected to the respective axles 6a of the rear drive wheels 6. Rotational drive power from the transmission is therefore transmitted through the rear wheel drive device 40 to the rear drive wheels 6.

A front wheel drive device 50 is positioned below the cabin 2. The front wheel drive device 50 comprises a propeller shaft 52 extending forwardly from the transmission, a differential 53 connected to a front end of the propeller shaft 52, and a pair of front wheel drive shafts 54 having inner ends connected to the differential 53 and outer ends connected to respective axles 5a (see FIG. 2) of the front wheels 5. Therefore, rotational drive power from the transmission is transmitted through the front wheel drive device 50 to the front wheels 5. Each of the front wheels 5 is rotatable about an axis P which is aligned with the axle 5a.

Figure 4:
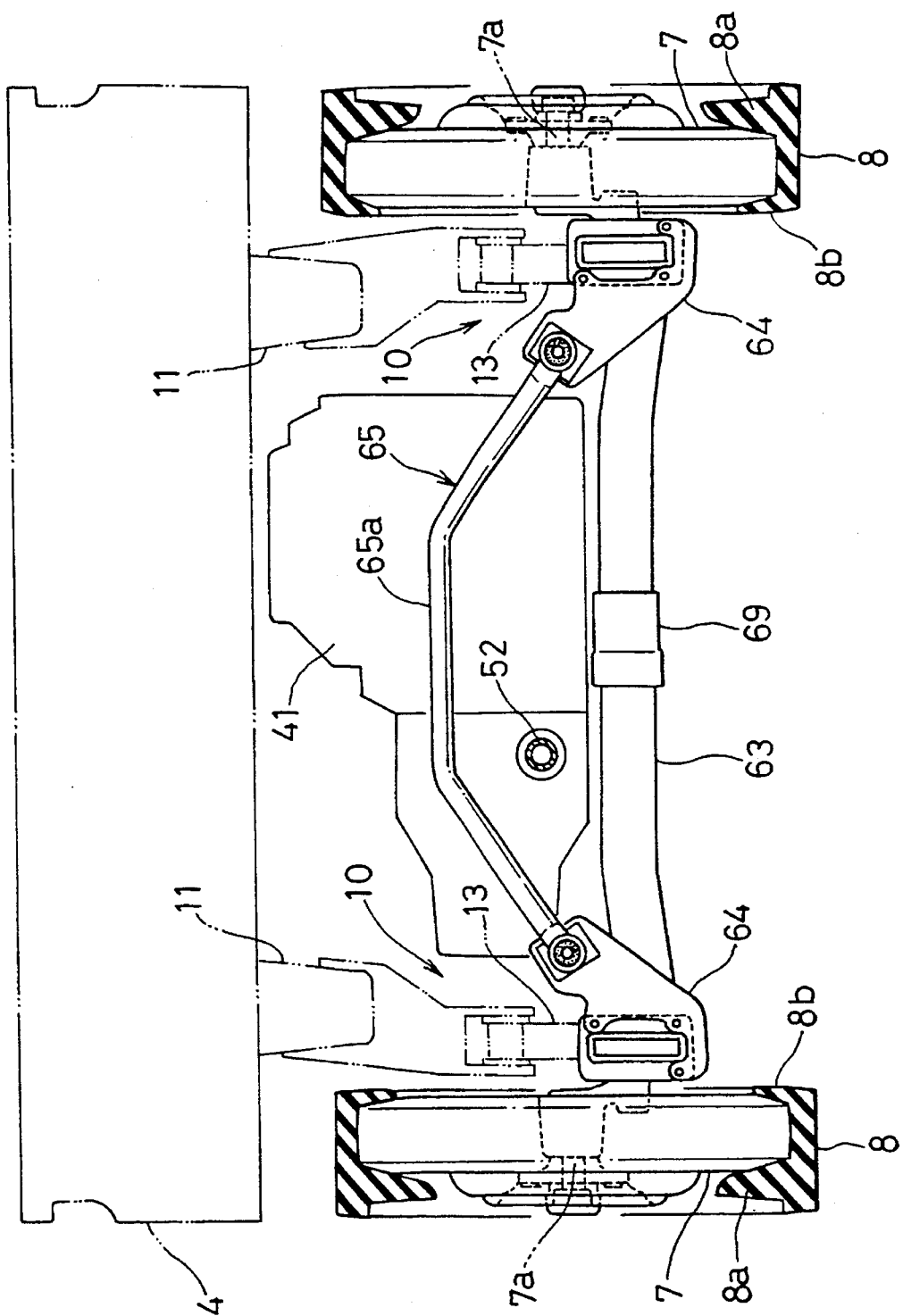
FIG. 4 is a cross-sectional view taken along line IV—IV of FIG. 3.

As shown in FIG. 4, the side guide teeth 8a, 8b project from the opposite sides of each of the crawler belts 8 into the annular endless configuration of the crawler belts 8. The side guide teeth 8a, 8b serve to prevent the crawler belts 8 from being dislodged from the tires of the drive wheels 6 and the idle wheels 7.

The outer side guide teeth 8a have a height greater than the height of ordinary curbs on roads for effectively preventing the crawler belts 8 from being dislodged from the tires of the drive wheels 6 and the idle wheels 7 due to interference with curbs.

As illustrated in FIGS. 3 and 4, the crawler belts 8 are positioned substantially within the width or transverse dimension of the vehicle body 4.

Figure 5:
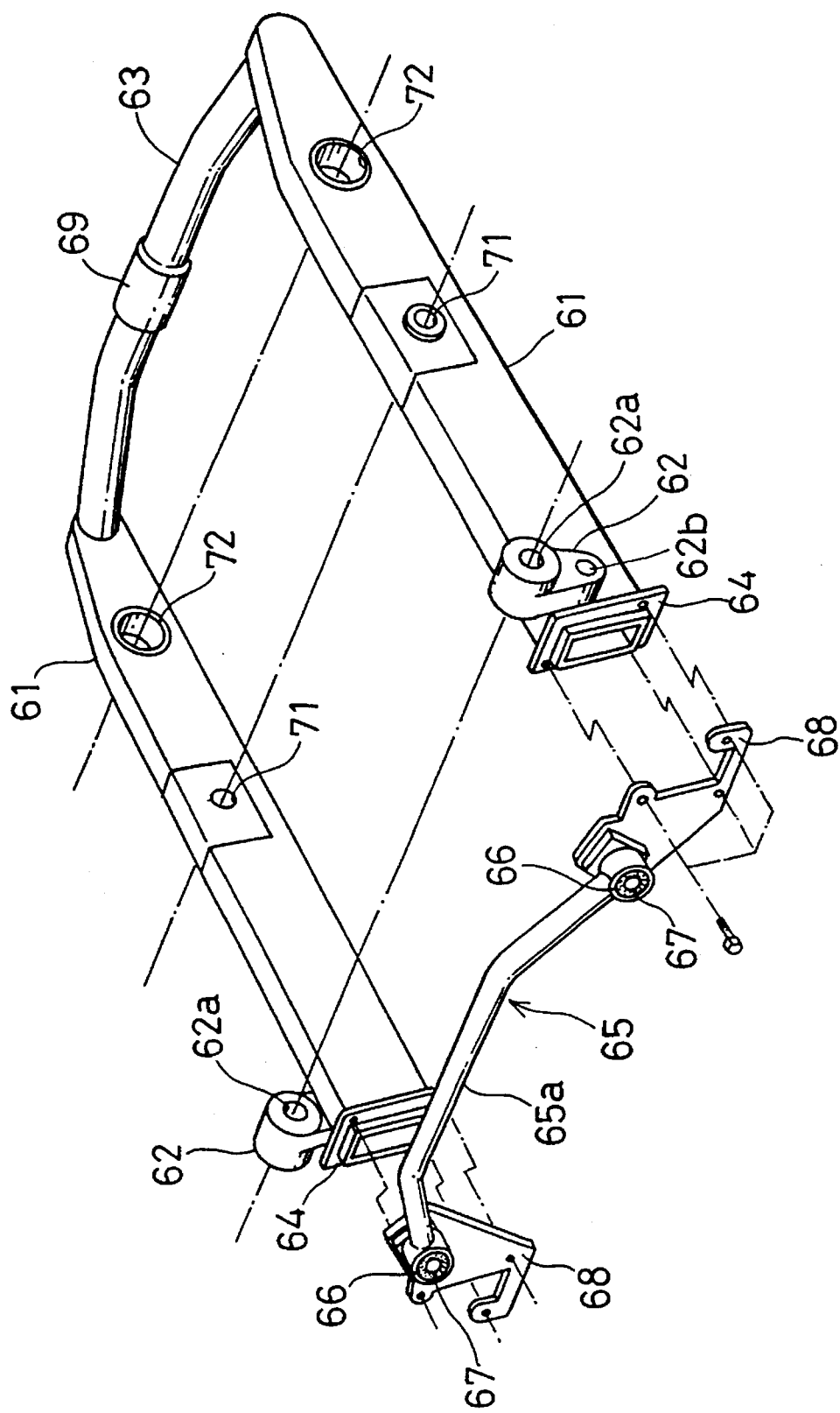
FIG. 5 is a perspective view of swing beams of the suspension device.

The swing beams 61 of the respective rear suspension assemblies are shown in FIG. 5. As shown in FIG. 5, the swing beams 61, which are transversely spaced from each other and extend parallel to each other, have respective rear ends fixedly joined transversely to each other by an axle beam (torsion-free joint rod) 63. Attachments 64 are mounted on respective front ends of the swing beams 61 and transversely interconnected by a rod 65 which is spaced forwardly from and extends parallel to the axle beam 63.

The rod 65 has attachment holes 66 defined in respective opposite ends thereof and having respective axes extending longitudinally of the vehicle 1, i.e., parallel to the swing beams 61. Rubber bushings 67 are fitted respectively in the attachment holes 66. The rubber bushings 67 are fastened to respective brackets 68 by bolts (not shown). The brackets 68 are fastened to the respective attachments 64 by bolts (not shown).

The rod 65 has an intermediate portion 65a raised from its opposite ends to avoid interference with the propeller shaft 52 (see also FIG. 4).

The swing beams 61, the axle beam 63 interconnecting the rear ends of the swing beams 61, and the rod 65 interconnecting the front ends thereof jointly make up a closed rectangular frame. Therefore, the swing beams 61 have their transverse rigidity increased by the axle beam 63 and the rod 65 that are secured to the swing beams 61 in the closed rectangular frame. When the vehicle 1 runs on rough terrain or at a high speed, therefore, the swing beams 61 are highly resistant to being deflected or oriented in different directions. Accordingly, the sets of the rear wheels 6, 7 on the opposite sides of vehicle 1 are prevented from being forcibly directed independently of each other, so that the vehicle 1 can move straight on rough terrain or high-speed cruising.

Eccentric hub carriers 62 are pivotally coupled to the swing beams 61, respectively, immediately behind the front ends thereof by respective pins 62b. The hub carriers 62, which are angularly movable about the respective pins 62b, have respective holes 62a defined therein remotely from the pins 62b. The axles 7a (see FIG. 2) of the respective rear idle wheels 7 are fitted in and supported by the holes 62a of the hub carriers 62. The tension of the crawler belts 8 trained around the rear wheels 6, 7 can be adjusted by angularly moving the hub carriers 62 about the pins 62b.

A torque canceler 69 is mounted centrally on the axle beam 69 for eliminating torques transmitted to the axle beam 69. The swing arms 61 have respective holes 71 defined therein at the longitudinally central portions thereof, and the pivot shafts 15 (see FIG. 2) are fitted respectively in the holes 71. The swing arms 61 also have holes 72 defined therein between the rear ends thereof and the holes 71, and the axles 6a (see FIG. 2) are fitted respectively in the holes 72.

Operation of the crawler vehicle 1 will be described below with reference to FIG. 2.

As described above, the distance A from the axis O to the axis F is longer than the distance B from the axis O to the axis R. Consequently, the axis O is positioned more rearwardly away from the front wheel 5 than would be if the distances A, B had a ratio of 1:1 (A:B=1:1). Since the distance C from the axis P to the axis O is increased, the stability of the crawler vehicle 1 at the time it runs straight at a high speed is increased.

Loads imposed respectively on the axes F, R are components of a load acting on the axis O, which are inversely proportional to the ratio of the distances A, B. The load on the axis R, i.e., the drive wheels 6, is greater than the load on the axis F, i.e., the idle wheels 7. Therefore, when the crawler vehicle 1 runs on soft terrain such as muddy or snowy roads, the crawler belt portions under the idle wheels 7, to which a relatively low load is applied, ride over the soft terrain, and the crawler belt portions under the drive wheels 6, to which a relatively high load is applied, compact the soft terrain, so that the crawler belts 8 can produce increased propulsive forces.

An experiment in which the crawler vehicle 1 ran on muddy terrain will be described below.

FIG. 6 shows running characteristics of a crawler vehicle according to an inventive example and a crawler vehicle according to a comparative example. In FIG. 6, the horizontal axis represents the speed (Km/hr) of the crawler vehicles, and the vertical axis the tractive forces (Kgf) of the crawler vehicles.

In the crawler vehicle according to the comparative example, the distance (corresponding to the distance A in FIG. 2) from the axis about which the swing beams are swingable to the axis about which the rear idle wheels are rotatable, and the distance (corresponding to the distance B in FIG. 2) from the axis about which the swing beams are swingable to the axis about which the rear drive wheels are rotatable, are substantially the same as each other.

A study of FIG. 6 indicates that the tractive force (propulsive force) of the crawler vehicle according to the inventive example was not largely lowered as the vehicle speed increased, and remained relatively large when the vehicle speed ranged from 2 to 5 Km/hr. On the other hand, the tractive force of the crawler vehicle according to the comparative example dropped largely as the vehicle speed increased, especially when the vehicle speed ranged from 2 to 5 Km/hr.

While the suspension device according to the present invention has been described above as being incorporated in a crawler vehicle in the form of a light truck, the principles of the present invention are also applicable to a light crawler vehicle in the form of a one-box vehicle or any of various other crawler vehicle types.

Although there has been described what is at present considered to be the preferred embodiment of the invention, it will be understood that the invention may be embodied in other specific forms without departing from the essential characteristics thereof. The present embodiment is therefore to be considered in all respects as illustrative, and not restrictive. The scope of the invention is indicated by the appended claims rather than by the foregoing description.

What is claimed is:

1. A suspension device in a crawler vehicle, comprising:
   a vehicle body having a front portion and a rear portion;
   a pair of parallel spaced swing beams, each having a length, a front end and a rear end mounted on the rear portion of said vehicle body for angular movement about a first axis located substantially centrally of the length of said swing beams each of the swing beams having a front portion and a rear portion;
   a hydraulic damper disposed and connected between the rear end of each swing beam and the vehicle body;
   a rear idle wheel rotatably supported on the front portion of each of said swing beam for rotation about a second axis positioned between the first axis and the front end of each swing beam;
   a rear drive wheel rotatably supported on the rear portion of each of said swing beam for rotation about a third axis positioned between the first axis and the rear end of each swing beam;
   a crawler belt trained around said rear idle wheel and said rear drive wheel; and
   a front wheel rotatably mounted on the front portion of said vehicle body;
   said second axis being spaced from said first axis by a first distance greater than a second distance by which said third axis is spaced from said first axis.

2. A suspension device according to claim 1, which further includes:
   a first rod interconnecting each of the front portions of the swing beams; and,
   a second rod interconnecting each of the rear portions of the swing beams.

3. A suspension device according to claim 2 which further comprises:
   a pair of parallel spaced leaf springs, each of said leaf springs disposed and between the body and a swing beam.

4. A suspension device according to claim 1, wherein said first distance and said second distance have a ratio of about 2:1.

5. A suspension device in a crawler vehicle, comprising:

a vehicle body having a front portion and a rear portion;

a pair of parallel spaced swing beams, each having a length, a front end and a rear end mounted on the rear portion of said vehicle body for angular movement about an axis located substantially centrally of the length of said swing beams, each of the swing beams having a front end and a rear end;

a hydraulic damper disposed and connected between the rear end of each swing beam and the vehicle body;

a rear idle wheel rotatably supported on said front end of each of said swing beam;

a rear drive wheel rotatably supported on each of said swing beams between substantially intermediate between said axis and said rear end of each of the swing beams;

a crawler belt trained around said rear idle wheel and said rear drive wheel; and a front wheel rotatably mounted on the front portion of said vehicle body.

6. A suspension device according to claim 5, which further includes:

a first rod interconnecting each of the front portions of the swing beams; and, a second rod interconnecting each of the rear portions of the swing beams.

7. A suspension device according to claim 6 which further comprises:

a pair of parallel spaced leaf springs, each of said leaf springs disposed and between the body and a swing beam.

* * * * *